United States Patent
Sun et al.

(10) Patent No.: US 9,437,208 B2
(45) Date of Patent: Sep. 6, 2016

(54) GENERAL SOUND DECOMPOSITION MODELS

(71) Applicant: Adobe Systems Incorporated, San Jose, CA (US)

(72) Inventors: Dennis L. Sun, Palo Alto, CA (US); Gautham J. Mysore, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 203 days.

(21) Appl. No.: 13/908,904

(22) Filed: Jun. 3, 2013

(65) Prior Publication Data

US 2014/0358534 A1    Dec. 4, 2014

(51) Int. Cl.
| | |
|---|---|
| *G10L 21/0208* | (2013.01) |
| *G10L 15/00* | (2013.01) |
| *G10L 25/51* | (2013.01) |
| *G10L 25/27* | (2013.01) |
| *G06K 9/62* | (2006.01) |
| *G10L 25/81* | (2013.01) |
| *G10L 25/84* | (2013.01) |

(52) U.S. Cl.
CPC ............ *G10L 21/0208* (2013.01); *G10L 15/00* (2013.01); *G10L 25/27* (2013.01); *G10L 25/51* (2013.01); *G06K 9/6239* (2013.01); *G10L 25/81* (2013.01); *G10L 25/84* (2013.01)

(58) Field of Classification Search
CPC ... G10L 21/0208; G10L 15/00; G10L 25/27; G10L 25/51
USPC ............... 704/233, 226, 231, 234, 246, 249, 704/250–251, 254–257, 500–504
See application file for complete search history.

(56) References Cited

U.S. PATENT DOCUMENTS

| | | | | |
|---|---|---|---|---|
| 5,970,446 | A * | 10/1999 | Goldberg ................ | G10L 15/20 704/233 |
| 6,460,017 | B1 * | 10/2002 | Bub ...................... | G10L 15/005 704/256 |
| 8,411,874 | B2 * | 4/2013 | Leichter .............. | G10L 21/0208 381/56 |
| 9,047,867 | B2 * | 6/2015 | Smaragdis ............ | G10L 15/142 |
| 2006/0053014 | A1 * | 3/2006 | Yoshizawa .............. | G10L 15/06 704/256.4 |
| 2011/0257974 | A1 * | 10/2011 | Kristjansson ....... | G10L 21/0208 704/246 |
| 2011/0295603 | A1 * | 12/2011 | Meisel .................... | G10L 15/07 704/246 |
| 2013/0093957 | A1 * | 4/2013 | Baraniuk ................. | H04N 9/67 348/659 |

OTHER PUBLICATIONS

Virtanen et al., "Monaural Sound Source Separation by Nonnegative Matrix Factorization with Temporal Continuity and Sparseness Criteria", IEEE Transactions on audio, speech, and language processing, vol. 15, No. 3, Mar. 2007.*

Helen et al., "Separation of drums from polyphonic music using non-negative matrix factorization and support vector machine", In Proceedings EUSIPCO' 2005.*

(Continued)

*Primary Examiner* — Vijay B Chawan
*Assistant Examiner* — Rodrigo Chavez
(74) *Attorney, Agent, or Firm* — Wolfe-SBMC

(57) ABSTRACT

Sound decomposition models are described. In one or more implementations, a plurality of individual models is generated for respective ones of a plurality of sound sources. The plurality of models is collected to form a universal audio model that is configured to support sound decomposition of sound data through use of one or more of the models. The plurality of models is not generated using a sound source that originated at least a portion of the sound data.

20 Claims, 10 Drawing Sheets

(56) References Cited

OTHER PUBLICATIONS

Candes, et al., "Enhancing Sparsity by Reweighted I1 Minimization", Journal of Fourier Analysis and Applications, vol. 14, No. 5, pp. 877-905, 2008., Oct. 15, 2008, pp. 877-905.
Duan, et al., "Online PLCA for Real-time Semi-supervised Source Separation", Latent Variable Analysis and Signal Separation, 2012., 2012, 8 pages.
Fevotte, et al., "Algorithms for nonnegative matrix factorization with the B-divergence", Neural Computation, vol. 23, No. 9, 2011., Mar. 7, 2011, 24 pages.
Fevotte, et al., "Nonnegative Matrix Factorization with the Itakura-Saito Divergence: With Application to Music Analysis", Neural Computation 21, 793-830 (2009), Jul. 3, 2008, pp. 793-830.
Hastie, et al., "BOOK—The Elements of Statistical Learning: Data Mining, Inference, and Prediction", Springer-Verlag, ISBN: 0387848576, 2009, All pages.
Hurmalainen, et al., "Group Sparsity for Speaker Identity Discrimination in Factorisation-based Speech Recognition", in Interspeech, 2012., 2012, 4 pages.
Lefevre, "Dictionary learning methods for singlechannel source separation", Ph.D. thesis, 2012, Oct. 2012, 136 pages.
Lefevre, et al., "Itakura-Saito Nonnegative Matrix Factorization With Group Sparsity", in International Conference on Acoustics, Speech and Signal Processing (ICASSP), 2011., 2011, 4 pages.
Reynolds, et al., "Speaker Verification Using Adapted Gaussian Mixture Models", Digital Signal Processing, vol. 10, No. 1, 2000., 2000, pp. 19-41.
Smaragdis, "Non-Negative Matrix Factor Deconvolution; Extraction of Multiple Sound Sources from Monophonic Inputs", Independent Component Analysis and Blind Signal Separation, 2004., Sep. 2004, 8 pages.
Smaragdis, "Supervised and Semi-Supervised Separation of Sounds from Single-Channel Mixtures", ICA'07 Proceedings of the 7th international conference on Independent component analysis and signal separation, 2007, 8 pages.
Sriperumbudur, et al., "On the Convergence of the Concave-Convex Procedure", Advances in Neural Information Processing Systems, 2009., 2009, 9 pages.
Vincent, et al., "Performance Measurement in Blind Audio Source Separation", IEEE TASLP, 14(4), Jul. 2006, 9 pages.
Virtanen, "Monaural sound source separation by nonnegative matrix factorization with temporal continuity and sparseness criteria", Audio, Speech, and Language Processing, IEEE Transactions on, vol. 15, No. 3, 2007., Mar. 2007, pp. 1066-1074.
Yuan, et al., "Model Selection and Estimation in Regression With Grouped Variables", Journal of the Royal Statistical Society: Series B, vol. 68, No. 1, Nov. 9, 2004, 29 pages.
Baraniuk,"Model-Based Compressive Sensing", EEE Transactions on Information Theory, (vol. 56 , Issue: 4 ), Dec. 9, 2009, 20 pages.

\* cited by examiner

| Penalty | $\Omega(H_S)$ |
|---|---|
| $\ell_1/\ell_\infty$ | $\sum_{g=1}^{M} \|H_g\|_\infty$ |
| $\ell_1/\ell_2$ | $\sum_{g=1}^{M} \|H_g\|_2$ |
| $\log/\ell_1$ | $\sum_{g=1}^{M} \log(\epsilon + \|H_g\|_1)$ |
| $\ell_0/\ell_1$ | $\#\{g : \|H_g\|_1 > 0\}$ |

Fig. 5

Algorithm 1 Supervised and Semi-supervised BKL-NMF inputs $V$, $W = [W_S \ W_N]$ (assuming $1^T W = 1$)
initialize $H$
repeat
    $R \leftarrow V./(WH)$
    $H \leftarrow H.*(W^T R)$
    for $g = 1 : M$ do
        $H_g \leftarrow \dfrac{1}{1 + \lambda/(\epsilon + \|H_g\|_1)} H_g$
    end for
    if semi-supervised then
        $W_N \leftarrow W_N.*(RH_N^T)$
        $W_N \leftarrow W_N./(11^T W_N)$   (renormalize $W$)
    end if
until convergence return $H$ .* and ./ denote componentwise multiplication and division.

| | SDR (dB) | K | | | | | | |
|---|---|---|---|---|---|---|---|---|
| | | 5 | 10 | 20 | 30 | 40 | 50 | 100 |
| | 5 | 9.60 | 9.85 | 9.77 | 9.60 | 9.49 | 9.30 | 8.96 |
| | 10 | 9.82 | 9.90 | 9.95 | 9.64 | 9.64 | 9.43 | 9.02 |
| | 20 | 9.72 | 9.96 | 9.92 | 9.68 | 9.68 | 9.58 | 8.99 |
| M | 30 | 9.85 | 9.84 | 9.92 | 9.53 | 9.66 | 9.51 | 8.93 |
| | 40 | 9.92 | 9.93 | 9.70 | 9.54 | 9.22 | 9.09 | 8.50 |
| | 50 | 9.78 | 10.03 | 9.78 | 9.58 | 9.43 | 9.19 | 8.38 |

802
Generate a plurality of individual models for respective ones of a plurality of sound sources

804
Collect the plurality of models to form a universal audio model that is configured to support sound decomposition of sound data through use of one or more of the models

*Fig. 8*

900 
902
Fit a universal audio model having a collection of individual models of sound sources to sound data, the fitting performed by selecting from the models in the collection based on correspondence of the sound data to respective models
904
Decompose the sound data using the selected models of the universal audio model
*Fig. 9*

GENERAL SOUND DECOMPOSITION MODELS

BACKGROUND

Sound decomposition may be leveraged to support a wide range of functionality. For example, sound data, such as that of a movie or of a recording of a song, is often captured in a noisy environment and may include both desirable and undesirable parts. The sound data in a movie, for instance, may include dialog, which is desirable, but may also include the unintended ringing of a cell phone. Thus, it is desirable to decompose the sound data such that the dialog may be separated from the cell phone.

However, conventional techniques that are employed to perform this decomposition rely on isolated training data from the actual sound sources and can be labor and resource intensive. When such training data is not available, the techniques can perform poorly, and in some cases, cannot be used at all.

SUMMARY

General sound decomposition models are described. In one or more implementations, a plurality of individual models is generated for each of a plurality of sound sources. The plurality of models is collected to form a universal audio model that is configured to support sound decomposition of sound data through use of one or more of the models. The plurality of models is not generated using a sound source that originated from at least a portion of the sound data.

In one or more implementations, a universal audio model having a collection of individual models of sound sources is fit to sound data. The fitting is performed by selecting from the models in the collection based on correspondence of the sound data to respective models. The sound data is decomposed using the selected models of the universal audio model.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 includes a table having examples that may be utilized for the penalty of FIG. 4.

FIG. 6 depicts an example of an algorithm that employs block-wise application of a shrinkage factor.

FIG. 7 shows an example of optimal signal-to-distortion ratio (SDR) for different combinations of number of basis vectors and number of speakers in a universal audio model.

FIG. 8 is a flow diagram depicting a procedure in an example implementation in which a universal audio model is formed using a plurality of models from a plurality of sound sources.

FIG. 9 is a flow diagram depicting a procedure in an example implementation in which a universal audio model is leveraged to guide decomposition of sound data.

DETAILED DESCRIPTION

Overview

Conventional sound decomposition techniques typically relied on training data formed through observations of actual sound sources that are to be decomposed from the sound data. Accordingly, these conventional techniques could fail when such training data was not available.

Sound decomposition model techniques are described. In one or more implementations, a universal audio model is generated for each of a plurality of different sources, such as users, noise, musical instruments, animals, and so on, to learn frequency representations from a plurality of examples of each source. In this way, a universal audio model may be learned that includes each of the individual models learned from the variety of different sources.

The universal audio model may then be used in instances in which training data is not available for one or more of the sound sources in an audio file. For example, sound data that is to be decomposed may be analyzed. This analysis may be performed to locate one or more models of the universal audio model that most closely reassemble sound sources in the sound data. The located models may then be used as training data to decompose the sound data. In this way, the universal audio model may be used in place of the training data that was conventionally learned from the sound sources included in the sound data. A variety of other features are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
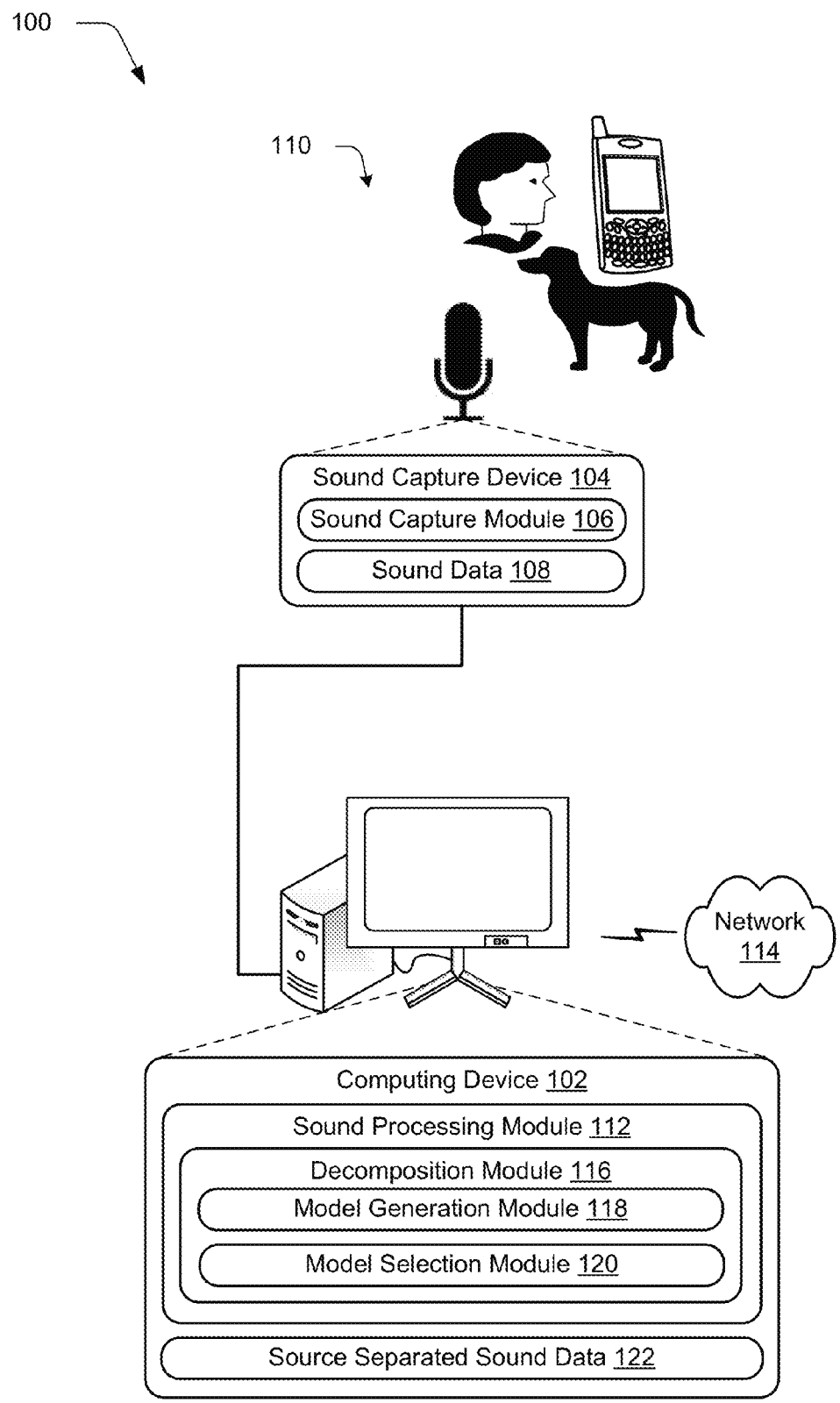
FIG. 1 is an illustration of an environment in an example implementation that is operable to employ sound decomposition techniques as described herein.

FIG. 1 is an illustration of an environment 100 in an example implementation that is operable to employ sound decomposition techniques described herein. The illustrated environment 100 includes a computing device 102 and sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including a sound capture module 106 that is representative of functionality to generate sound data 108. The sound capture device 104, for instance, may generate the sound data 108 as a recording of an audio scene 110 having one or more sound sources, which are illustrated as a user, a dog, and a cell phone in FIG. 1. This sound data 108 may then be obtained by the computing device 102 for processing.

The computing device 102 is illustrated as including a sound processing module 112. The sound processing module 112 is representative of functionality to process the sound data 108. Although illustrated as part of the computing device 102, functionality represented by the sound processing module 112 may be further divided, such as to be performed "over the cloud" by one or more servers that are accessible via a network 114 connection, further discussion of which may be found in relation to FIG. 10.

An example of functionality of the sound processing module 112 is represented as a decomposition module 116. The decomposition module 116 is representative of functionality to decompose the sound data 108 according to a likely source of respective part of the sound data 108. As illustrated in the audio scene 110 of FIG. 1, for instance, the decomposition module 116 may be used to separate the sound data 108 according to different sources, such as to separate dialog from the person in the audio scene 110 from ringing of a cell phone and barking of the dog to form source separated sound data 122. This may be used to support a variety of different functionality, such as audio denoising, music transcription, music remixing, audio-based forensics, and so on.

To perform this decomposition, the decomposition module 116 may employ a variety of different functionality. One example of this functionality is illustrated as a model generation module 118. The model generation module 118 is representative of functionality to generate models of respective sound sources to form a universal audio model, such as users, noise, musical instruments, and so on. Further discussion of functionality of the model generation module 118 may be found in relation to FIG. 2.

Another example of the functionality of the decomposition module 116 is illustrated by a model selection module 120. The model selection module 120 is representative of functionality to select one or more of a plurality of models of a universal audio model that are to be used as training data to decompose sound data 108. The model selection module 120, for instance, may be used to analyze the sound data 108 and select models from the universal audio model that most closely correspond to the sound data 108. The selected models may then be used as part of the decomposition process to form the source separated sound data 122, further discussion of which may be found in relation to FIG. 3.

Figure 2:
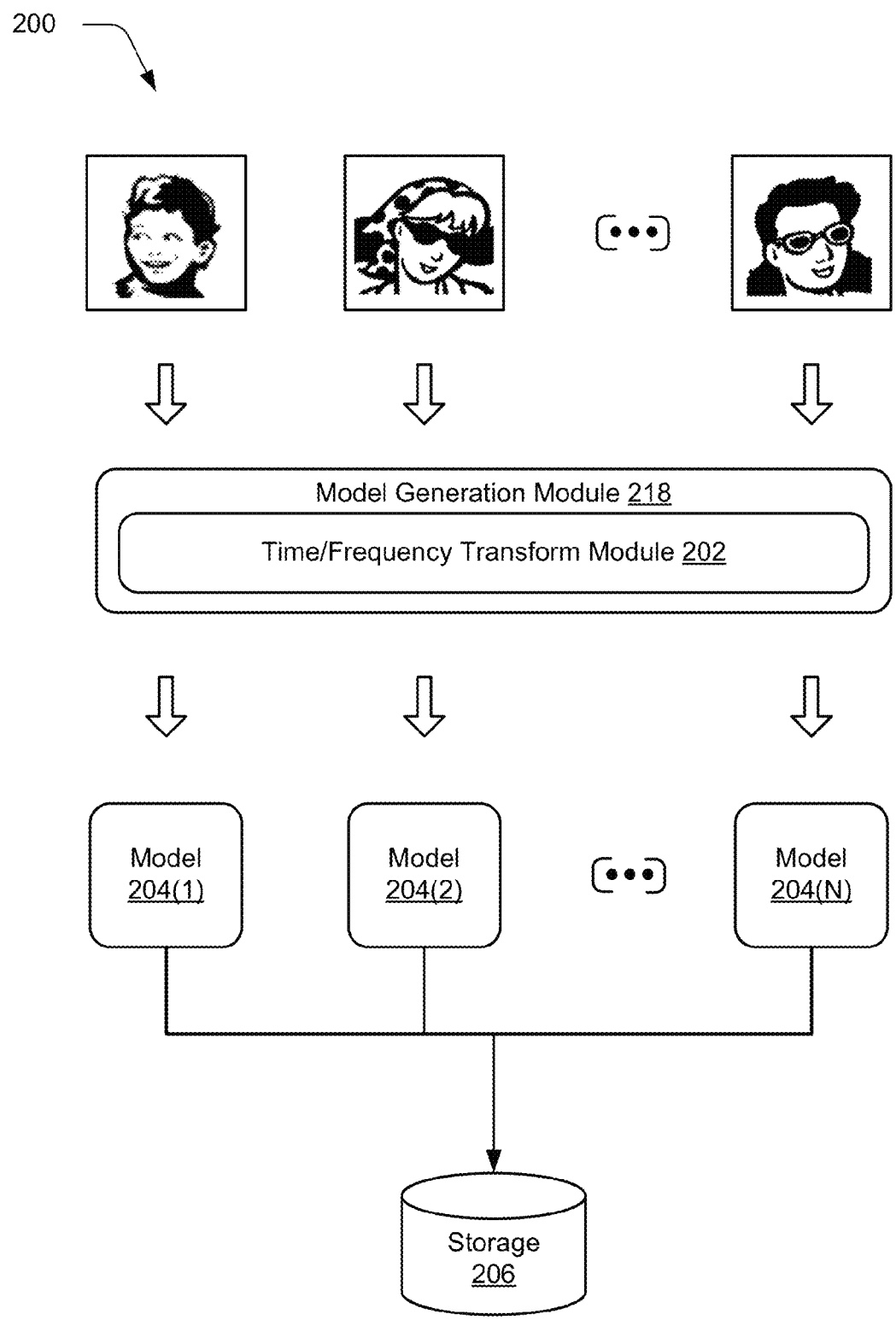
FIG. 2 depicts a system in an example implementation in which a universal audio model is generated from a plurality of different audio sources.

FIG. 2 depicts a system 200 in an example implementation in which a universal audio model is generated from a plurality of different audio sources. Sound data is received from a plurality of different sound sources as previously described in relation to FIG. 1, which are illustrated as speech from users in this example but other examples are also contemplated as previously described.

The sound data 108 is then processed by a model generation module 118. The model generation module 118, for instance, may employ one or more techniques to generate a representation of the sound data for each of the sound sources. In the illustrated example, the model generation module 118 employs a time/frequency transform module 202. The time/frequency transform module 202 is representative of functionality to form one or more spectrograms of a respective sound signal. For example, a time-domain signal may be received and processed to produce a time-frequency representation. Other representations are also contemplated, such as a time domain representation, an original time domain signal, and so on.

Spectrograms may be generated in a variety of ways, an example of which includes calculation as magnitudes of short time Fourier transforms (STFT) of the signals and so forth. Additionally, the spectrograms may assume a variety of configurations, such as narrowband spectrograms although other instances are also contemplated.

The model generation module 118 may then be used to generate a model 204(1), 204(2), . . . , 204(N) for a respective one of the plurality of sound sources. These models 204(1)-204(N) may then be collected in storage 206 to form a universal audio model, the use of which may be used to guide a sound decomposition process when training data is not available, an example of which is described as follows and shown in a corresponding figure.

Figure 3:
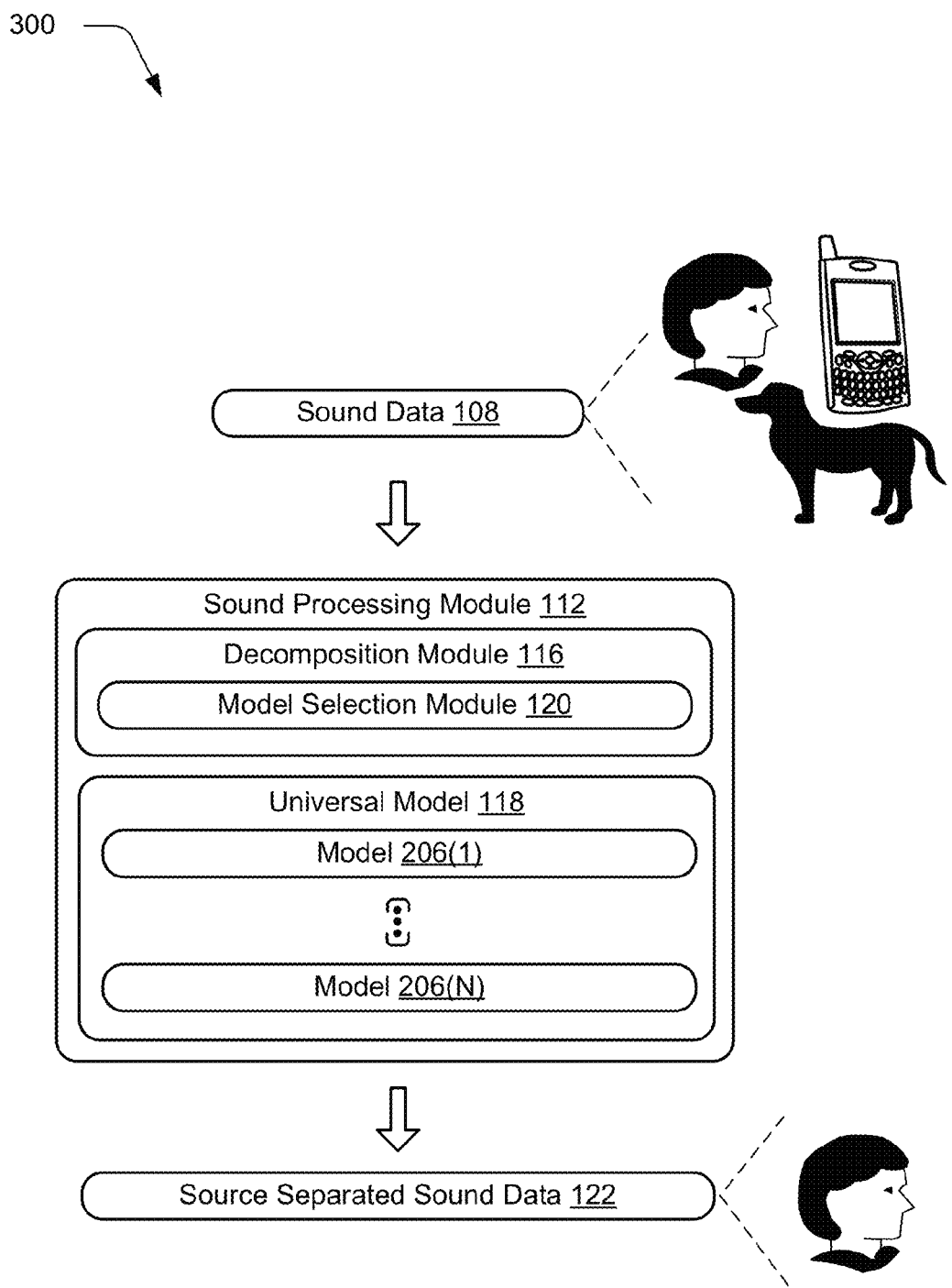
FIG. 3 depicts a system in an example implementation in which sound data is decomposed through use of a universal audio model.

FIG. 3 depicts a system 300 in an example implementation in which sound data 108 is decomposed through use of a universal audio model. In applications such as audio denoising, music transcription, music remixing, and audio-based forensics, for example, a single channel recording may be decomposed into its respective sources. One technique to perform such decomposition is based on nonnegative matrix factorization and related latent variable models although other examples are also contemplated.

Sound data 108, for instance, may be received by a sound processing module 112. As previously described, the sound data 108 may originate from a variety of different sources, such as speech from a user, barking of a dog, a ring of a cell phone, and so on.

The sound data 108 is then processed by a decomposition module 116 of the sound processing module 112. The decomposition module 116, for instance, may leverage a model selection module 120 to select one or more models 204(1)-204(N) based on how well those models 204(1)-204(N) correspond to the sound data 108. The model selection module 120, for instance, may determine that a few of the models 204(1)-204(N) strongly correspond to the sound data 108 and therefore employ those models and not others of the universal audio model 302 as part of the sound decomposition process. In another example, strong correspondence may not be determined and as such additional models 204(1)-204(N) (e.g., all or most of the models) may be used as part of the decomposition process to guide separation and formation of the source separated sound data 122. A variety of different techniques may be used as part of this selection process, such as block sparsity or other regularization techniques, an example of which is described and shown in relation to the following section.

Regardless of how selected, the models 204(1)-204(N) may then be used to guide the sound decomposition process in a manner similar to how training data may be used. The decomposition module 116 may include functionality to identify components in the sound data 108. For example, the decomposition module 116 may estimate a likely contribution of each source to portions of the sound data 108 based at least in part on the selected models 206(1)-206(N). The decomposition module 116 may then use this identified contribution to separate the sound data 108 based on labeling resulting from the analysis to generate the source separated sound data 122. An example of such a process involving block sparsity is described in the following example implementation.

Example Implementation

Supervised and semi-supervised source separation algorithms that are based on non-negative matrix factorization have been shown to be quite effective in certain situations. However, the algorithms typically rely on isolated training data of one or more sources, which is often difficult to obtain. Therefore, this may limit the practical applicability of these algorithms as previously described.

Accordingly, techniques are described in which generalized training data is used in the absence of specific training examples. For example, a universal audio model may be learned from a general corpus of speech, which may be used to separate audio from other sound sources. Models learned as part of this technique may be used in lieu of speaker-dependent training examples, and thus circumvent the aforementioned problem. Thus, these techniques may be used to improve performance when training data is not available. Although the following describes examples of speech training, it should be readily apparent that these techniques may be applied to a variety of different types of sound sources, such as musical instruments, noise, animals, weather sounds, and so forth as previously described.

Data-driven approaches are effective at separating sources in sound data formed from an audio signal. One example of such an approach is non-negative matrix factorization (NMF), which is utilized to solve the following optimization problem:

$$\min_{W,H \geq 0} D(V \| WH)$$

where "D" is a divergence measure, "V" is the power or magnitude spectrogram, and "W,H" are the desired factors. Because the factors are constrained to be nonnegative, "W" and "H" have natural interpretations as latent spectral features and the activations of those features in the signal, respectively. From this model, a pipeline for performing data driven source separation of the decomposition module 116 may proceed as follows. Given isolated training data for the two sources, e.g., speech and noise:

Compute the spectrograms "$V_S$" and "$V_N$" of the speech and noise training data, respectively, as well as the spectrogram "V" of the mixture signal;

Factorize the spectrograms:

$$V_i \approx W_i \tilde{H}_i, i = S, N.$$

Fix the learned spectral features "$W_S$", "$W_N$" from above and learn the activations "H" in the mixture signal:

$$V \approx [W_S W_N] H.$$

The activations can then be partitioned into two blocks:

$$H = \begin{bmatrix} H_S \\ H_N \end{bmatrix}$$

The first block corresponds to speech, the other to the noise in the above example. From this, the speech part of the mixture can be recovered as "$W_S H_S$". This serves as the estimated speech spectrogram, from which the speech waveform estimate may be obtained by combining it with the mixture phase, and taking the inverse STFT.

The approach described above is known as supervised separation. A similar approach is also possible in a scenario in which isolated training data is available for just one of the two sources. For example, in speech denoising, it may be possible to obtain isolated noise training data (e.g., when the speaker pauses), but not isolated speech training data. This semi-supervised case involves a slight modification to the above algorithm: e.g., instead of learning "H" as in the above optimization problem, "$W_S$" and "H" are learned simultaneously.

Techniques are also described herein in which the knowledge of one of the sources (e.g., that the other source is speech) is utilized to improve upon semi-supervised separation or to perform separation when there is no training data of either source. To know a sound class, such as speech, is to have a mathematically useful model (e.g., representation) of it. The models may be learned from data, including examples similar to the source that is to be extracted and thus may be referred to as universal audio models.

Universal audio models may be generated by pre-training on a large corpus of examples, with the models varying as to what features are learned and how the features are used. In the following sections, an example is described to separate speech and noise but as previously described these techniques may be utilized for a variety of different sound data from a variety of different types of sound sources.

Universal Audio Models

In this section, a universal audio model is described that is based on the principle of block sparsity, although other examples are also contemplated. Additionally, although a speech denoising application is the focus of the sound decomposition technique in this example, it should also be readily apparent a variety of different sound decomposition techniques may leverage this functionality. Further as previously described these techniques may be applied to any class of sounds.

Model Generation

The block sparsity model decouples the training of the model from its application. In the training stage, a matrix "$W_i$" of basis vectors is learned separately for each speaker in the corpus, "i=1, ..., M." This can be done using NMF, a probabilistic model, or even by handcrafting the basis vectors. The universal speech model is then obtained by concatenating the learned speech model into a single large matrix in this example:

$$W_S = [W_1 \ldots W_M].$$

To add a speaker to an existing model, the basis vectors of that sound source are learned, which may be performed independently of how the existing model was learned. Thus, efficient reuse of data may be enabled and support ready extensions to the model.

For a noise model "$W_N$" in addition to the universal speech model, for instance, separating speech and noise becomes a problem of finding the corresponding activations "$H_S$" and "$H_N$" as described above. However, the number of parameters is large, possibly more than the number of observations, so simply finding "H≥0" and minimizing "D(V∥W,H)" may not yield desired separation results. In high-dimensional settings, appropriate regularization can be an effective strategy to prevent over fitting.

Block sparsity refers to one of a variety of choices of regularization. The intuition is that if the actual sound source (e.g., speaker) is similar to a sound source (e.g., speaker) is in the universal audio model, then supervised separation using the basis vectors for that sound source of the universal audio model is close to optimal. This can be achieved by imposing a penalty "Ω" that induces block sparsity of "$H_S$," where the blocks are the activations of the individual speaker models. The optimization criterion is shown as follows.

$$\min_{W, H \geq 0} D(V \| WH) + \lambda \Omega(H_S)$$

For sufficiently large "λ," this penalty encourages use of a single sound source model. At the other extreme, "λ=0" corresponds to a case in which each of the models of the universal audio model is used. For "λ" in between these two extremes, the model is permitted to borrow strength from different models in case a single speaker model is insufficient.

Thus, the parameter "λ" controls the tradeoff between separation and artifacts. For "λ=0," the reconstructed sources have few artifacts but the separation may be poor. As "λ" increases, separation typically improves at the price of artifacts. Thus, "λ" is a tuning parameter with a physical interpretation that is adjustable by an end user, depending on the requirements of the application. Block sparsity may also provide robustness against poorly fitting speech models by omitting these models entirely.

Figure 4:
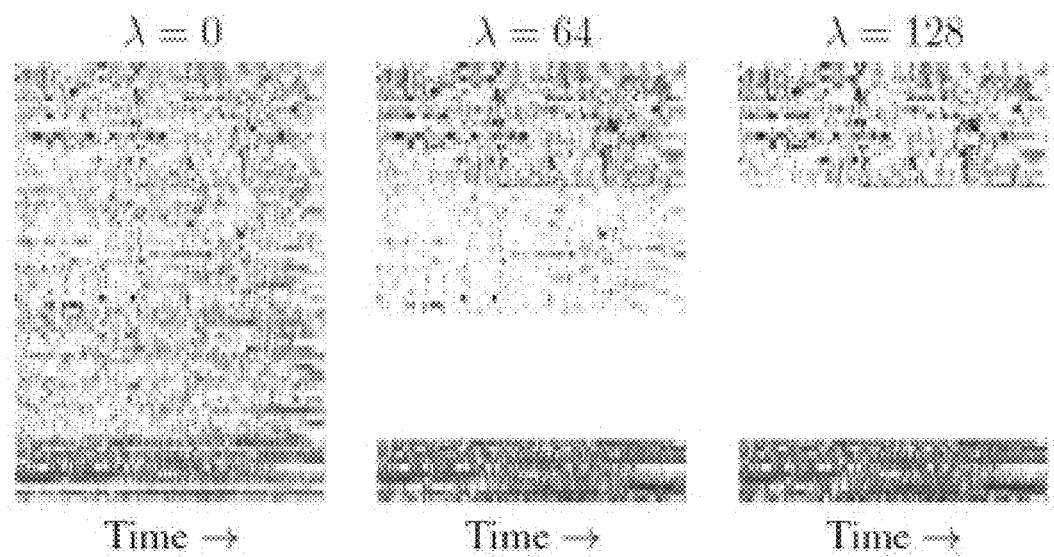
FIG. 4 depicts an example of evolution of an activation matrix for an increasing penalty usable to choose models of the universal audio model.

FIG. 4 depicts an example 400 of evolution of the activation matrix "H" as "λ" increases for a universal speech model having two female speakers and one male speaker (K=20 basis vectors each), as applied to a test mixture of the first female speaker and motorcycle noise (K=10 basis vectors). Each of the coefficients are active for "λ=0," the male speaker model is dropped first as "λ" increases, and just the basis vectors of the actual speaker remain for "λ" when sufficiently large. It should be noted that the noise activations are not penalized and that the group sparsity comes at the price of shrinking the coefficients within each group as further described below.

Block-sparsity-inducing penalties are also known as "group lasso" or "multitask regression." FIG. 5 includes a table 500 having examples that may be utilized for the penalty "Ω" The choice of "Ω" is a delicate issue. For example, penalties that induce block sparsity typically involve an outer penalty which induces sparsity in the norms of the blocks. However, by forcing the norms of the blocks to zero, the entries in those blocks are also forced to zero. For instance, the "$l_0/l_2$" penalty penalizes the "$l_0$" norm (i.e., the number of nonzero components) of the "$l_2$" norms of the blocks. Thus, this penalty may be applied to penalize the number of blocks without further shrinking the coefficients, but it is intractable to solve in general. There are a number of relaxations of the "$l_0$" norm which admit tractable solutions, but all involve some shrinkage of the coefficients.

A "$\log/l_0$" penalty may be used for which there are simple multiplicative updates that monotonically decrease the objective. The convex ""$l_0/l_2$" penalty may also be used, which is fit using heuristic multiplicative updates.

In one or more implementations, an algorithm is considered where "D" is a Kullback-Leibler divergence and "Ω" is "$\log/l_1$", a problem that will henceforth be referred to as block KL-NMF or BKL-NMF. First, consider the supervised setting, where isolated noise training data is available and hence "W" is fixed. An iterative algorithm can be derived by majorization-minimization. First, using Jensen's inequality, "D" may be majorized for any "$\Sigma_k \pi_{ijk}=1$" as follows:

$$D(V \| WH) \leq -\sum_{i,j} V_{ij} \sum_k \pi_{ijk} \log W_{ik} H_{kj} + \sum_{i,j} (WH)_{ij} + \text{const.}$$

In particular, the following expression may be chosen:

$$\pi_{ijk} = \frac{W_{ik} \tilde{H}_{kj}}{\sum_k W_{ik} \tilde{H}_{kj}}$$

where "$\tilde{H}$" denotes the value of "H" at a current iteration. Next, since "Ω" is concave, this value may be majorized by its tangent at:

$$\tilde{H}: |\Omega(H) \leq \Omega(\tilde{H}) + \langle \nabla \Omega(\tilde{H}), H - \tilde{H} \rangle$$

which yields $$\lambda \Omega(H_S) \leq \lambda \sum_g \left\langle \frac{\tilde{H}_g}{\epsilon + \|\tilde{H}_g\|_1}, H_g \right\rangle + \text{const.}$$

The majorizing function of the above functions can be minimized by setting the gradient equal to zero, leading to efficient multiplicative updates as described for the activations in the initial expression described above. This is an example of a concave-convex procedure (CCCP), for which convergence is known.

Algorithm 1 shown in the example 600 of FIG. 6 differs from standard supervised separation algorithms in the block-wise application of a shrinkage factor. FIG. 7 shows an example 700 of optimal signal-to-distortion ratio (SDR) for different combinations of number of basis vectors "K" and number of speakers "M" in the universal audio model, averaged over 50 test examples (5 test speakers times ten noise examples).

The universal audio model may be fitted using the same computational cost as standard NMF with KL divergence (hereafter, KL-NMF) in the above implementation example. Indeed, from the end user's perspective, the relevant comparison is between supervised BKL-NMF and semi-supervised KL-NMF, which are the two options in which just noise training examples are available. The latter additionally involves an update of "$W_N$," so as a result supervised BKL-NMF (for a single "$\lambda$") can even be faster than semi-supervised KL-NMF. In the semi-supervised setting training data from either source is not available, a single additional update of the noise model "$W_N$" is involved as reflected above.

Thus, in this implementation example techniques are described to perform source separation using generalized training data in the absence of specific training examples. These techniques may involve generating models for each example, and use of block sparsity in the fitting to select a subset of models. The resulting audio source independent model can be fit at an approximate computational cost that matches standard NMF and achieves comparable performance to techniques that utilize source specific training data. Further discussion of these and other techniques may be found in relation to the following procedures.

Example Procedures

The following discussion describes user interface techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

FIG. 8 depicts a procedure 800 in an example implementation in which a universal audio model is formed using a plurality of models from a plurality of sound sources. A plurality of individual models is generated for respective ones of a plurality of sound sources (block 802). This may be performed using a variety of different techniques, such as non-negative matrix factorization (NMF), latent component analysis, and so on. This may also be performed for a variety of different sources, such as speech, noise, musical instruments, and so on.

The plurality of models is collected to form a universal audio model that is configured to support sound decomposition of sound data through use of one or more of the models. The plurality of models is not generated using a sound source that originated at least a portion of the sound data (block 804). The universal audio model, for instance, may be configured for speech and therefore the sound sources may be different than sound sources included in sound data that is to be decomposed. In this way, sound decomposition may be performed even in instances in which specialized training data for sound sources of the sound data is not available.

FIG. 9 depicts a procedure 900 in an example implementation in which a universal audio model is leveraged to guide decomposition of sound data. A universal audio model having a collection of individual models of sound sources is fit to sound data. The fitting is performed by selecting from the models in the collection based on correspondence of the sound data to respective models (block 902). The selection of the models may be performed in a variety of different ways. For example, the selecting may be performed based on a penalty that encourages the correspondence and use of fewer of models in instances of strong correspondence between a subset of the models and the sound data as opposed to instances of weak correspondence between the subset of the models and the sound data. An example of such a penalty was described above as involving block sparsity but other examples are also contemplated as previously described.

The sound data is decomposed using the selected models of the universal audio model (block 904). As before, a variety of different techniques may be employed to perform the decomposition, such as non-negative matrix factorization (NMF), latent component analysis, and so on.

Example System and Device

Figure 10:
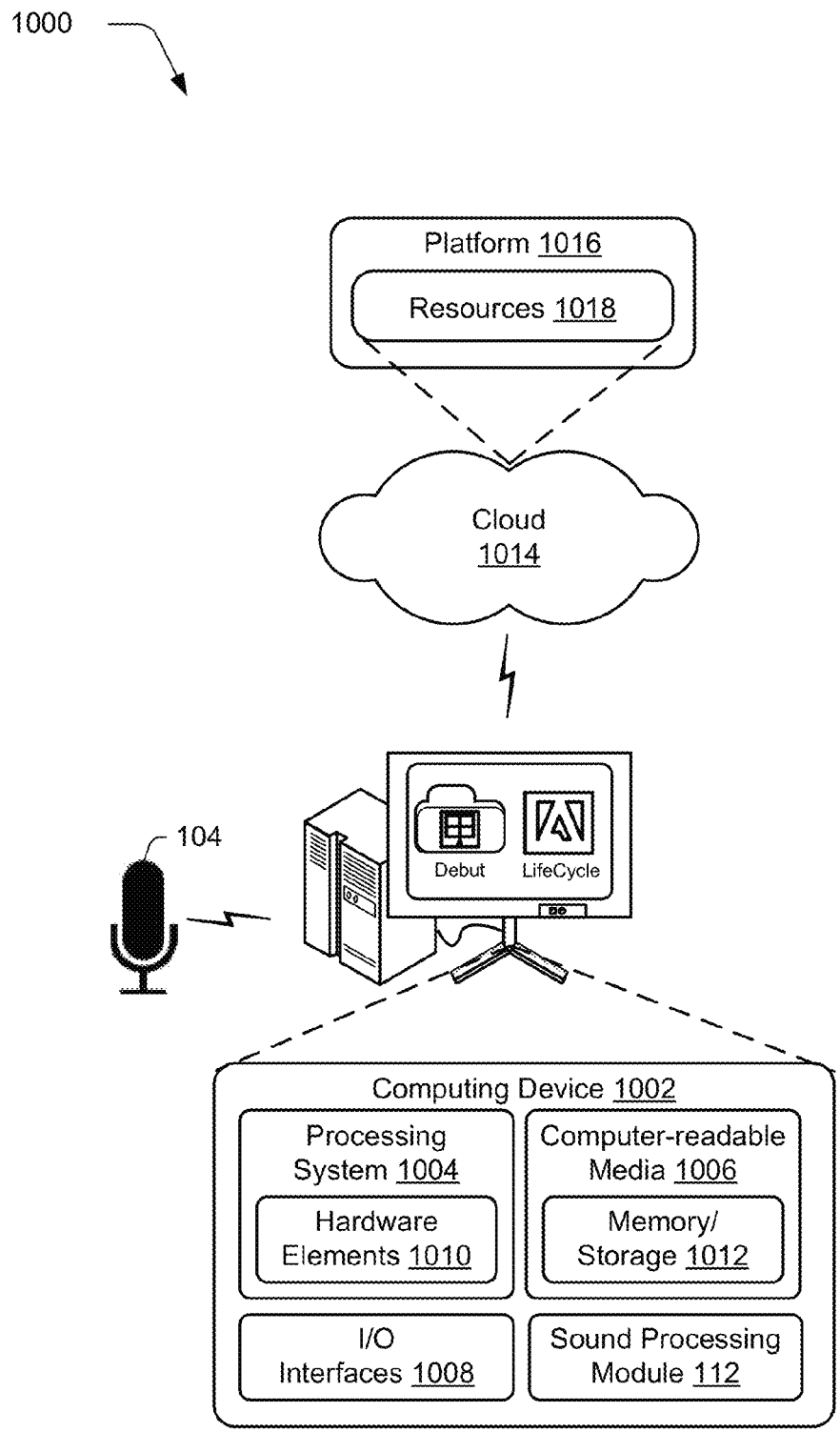
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the sound processing module 112, which may be configured to process sound data. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   receiving a sound signal originated by one or more sound sources;
   fitting a universal audio model having a collection of individual models of sound sources to sound data associated with the sound signal, the fitting performed by selecting from the models in the collection based on correspondence of the sound data to respective said models, wherein the selecting is performed based on a penalty that encourages the correspondence and use of fewer of models in instances of strong correspondence between a subset of the models and the sound data as opposed to instances of weak correspondence between the subset of the models and the sound data; and
   decomposing the sound data using the selected models of the universal audio model.

2. A method as described in claim 1, wherein the universal audio model does not include a model trained on a specific sound source that originated at least a portion of the sound data.

3. A method as described in claim 1, wherein the decomposing is performed to also include use of training data learned on a specific sound source that originated at least a portion of the sound data.

4. A method as described in claim 1, wherein the selecting is performed based on a penalty that encourages block sparsity.

5. A method as described in claim 1, wherein each of the models is learned based on non-negative matrix factorization (NMF) or latent component analysis.

6. A method as described in claim 1, wherein the decomposing is performed based on non-negative matrix factorization (NMF) or latent component analysis.

7. A method as described in claim 1, wherein the decomposing is performed to support audio denoising, music transcription music remixing, or audio-based forensics.

8. A method implemented by one or more computing devices, the method comprising:
   receiving sound signals originated from a plurality of sound sources;
   generating a plurality of individual models for respective ones of the plurality of sound sources, the generating comprising determining frequency representations from a plurality of examples of each of the plurality of sound sources; and
   collecting the plurality of models to form a universal audio model that is configured to support sound decomposition of a separate instance of sound data through use of one or more of the models, the plurality of models not being generated using a sound source that originated at least a portion of the separate instance of sound data, the universal audio model further configured to utilize generalized training data stored in the universal audio model in the absence of specific training data stored in the universal audio model for the sound decomposition of the separate instance of sound data.

9. A method as described in claim 8, further comprising decomposing the sound data using selected models of the universal audio model.

10. A method as described in claim 9, wherein the decomposing is performed to also include use of training data learned on a specific sound source that originated at least a portion of the sound data.

11. A method as described in claim 9, wherein the decomposing is performed based on non-negative matrix factorization (NMF) or latent component analysis.

12. A method as described in claim 8, wherein the universal audio model is configured to support selection of particular ones of the plurality of models based on a penalty that encourages the correspondence and use of fewer of models in instances of strong correspondence between a subset of the models and the sound data as opposed to instances of weak correspondence between the subset of the models and the sound data.

13. A method as described in claim 12, wherein the selecting is performed based on a penalty that encourages block sparsity.

14. A method as described in claim 8, wherein each of the models is learned based on non-negative matrix factorization (NMF) or latent component analysis.

15. A system comprising:
   at least one module implemented at least partially in hardware and configured to collect a plurality of models to form a universal audio model that is configured to support sound decomposition of sound data through use of one or more of the models; and
   one or more modules implemented at least partially in hardware and configured to fit the universal audio model to the sound data to decompose the sound data by selecting from the models in the collection using a penalty term that encourages block sparsity.

16. A system as described in claim 15, wherein the universal audio model does not include a model trained on a specific sound source that originated at least a portion of the sound data.

17. A system as described in claim 15, wherein one or more modules are configured to perform the decomposing to also include use of training data learned on a specific sound source that originated at least a portion of the sound data.

18. A system as described in claim 15, wherein the penalty encourages use of fewer of models in instances of strong correspondence between a subset of the models and the sound data as opposed to instances of weak correspondence between the subset of the models and the sound data.

19. A system as described in claim 15, wherein each of the models is learned based on non-negative matrix factorization (NMF) or latent component analysis.

20. A system as described in claim 15, wherein one or more modules are configured to estimate a likely contribution of each source to portions of the sound data based at least in part on the selected models.

* * * * *